UNITED STATES PATENT OFFICE.

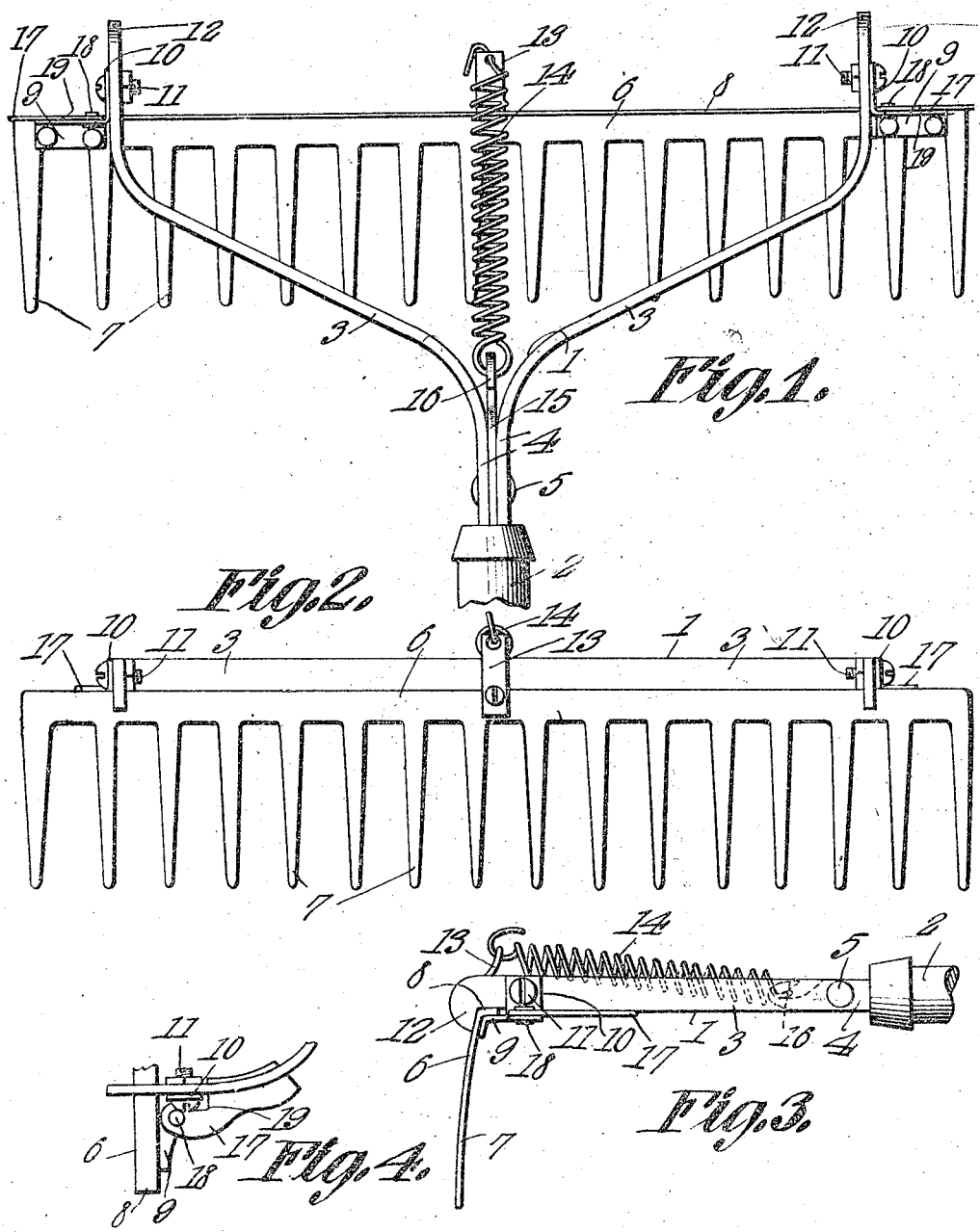

EDWIN C. STEELE, OF OXFORD, INDIANA.

HAND-RAKE.

1,122,549. Specification of Letters Patent. Patented Dec. 29, 1914.

Application filed January 28, 1914. Serial No. 815,030.

*To all whom it may concern:*

Be it known that I, EDWIN C. STEELE, a citizen of the United States, residing at Oxford, in the county of Benton and State of Indiana, have invented a new and useful Hand-Rake, of which the following is a specification.

The present invention appertains to rakes, and particularly to hand rakes adapted for garden and lawn uses, or the like.

It is the object of the present invention to provide a hand rake, so constructed and operable, that the rake teeth may be readily cleared of any accumulations or extraneous matter clinging thereto, without the necessity of the operator removing the matter from the teeth by hand, as is usual with the prevailing types of rakes.

Another object of the present invention is to provide a rake of the nature indicated embodying a spring pressed toothed head, arranged to be slid forwardly, or away from the operator, by a downward or forward thrust of the handle, in order that the accumulations or foreign matter caught by the teeth, may be readily ejected therefrom to clear the teeth of the rake head, the rake head being returned to normal or active position as soon as the same is lifted from the ground or soil.

A further object of the present invention is to provide a device of the nature indicated having locking means for holding the rake head rigidly in active or normal position, when desired.

It is also within the spirit of the present invention, to provide a hand rake of the character specified, which will be comparatively simple, compact, light and inexpensive in construction, and which will be simple, convenient, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a plan view of the rake, with the rake head in clearing or ejecting position, a portion of the handle being broken away. Fig. 2 is an end view of the rake, looking toward the head, the head being in active or normal position. Fig. 3 is a side elevation of the rake, with the parts as depicted in Fig. 2, a portion of the handle being broken away. Fig. 4 is a fragmental plan view, in detail, of one of the locking or latch devices for the rake head.

In carrying out the present invention, a fork 1 is secured to the outer end of the handle 2, the fork 1 being constructed of a pair of bars or strips 3 having certain end portions 4 secured together by rivets or other securing means 5, and having their other or free end portions offset away from each other, or diverging to provide the fork. The portions 4, which form the shank of the fork, are received by the end of the handle 2.

The rake head 6, as illustrated, is stamped from a plate of sheet metal, but it is to be understood that the same may be fashioned in various well known manners. The rake head 6 is provided with the usual rake teeth 7, and the upper edge of the rake head 6 is disposed below the fork 1 and is provided with an angular flange or lip 8 projecting inwardly or toward the handle 2. The rake head 6 is pivotally carried by the arms or branches of the fork 1 by means of angle members or plates 9 riveted or otherwise secured within the corners of the rake head formed by the flange or lip 8, and having angular ears 10 overlapping the outer sides of the fork arms or branches at the free ends of the said arms or branches, and pivoted thereto, by means of bolts or other pivot members 11. It is to be understood, however, that the members or plates 9 may be integral with the flange or lip 8, if desired, with the same result. As illustrated, the end portions of the rake head project or protrude beyond the arms or branches of the fork, the members or pieces 9 being carried by the end portions of the rake head beyond the arms or branches of the fork and having the upstanding ears 10 at their inner ends.

The bolts or pivots 11 of the rake head are disposed inwardly relative to the plane of the rake head, whereby the ears 10 permit the rake head to swing into parallelism with the fork 1 and whereby, when the rake head is swung outwardly to active or normal position, the flange or lip 8 will swing against the end portions of the fork arms or branches to limit the outward movement of the rake head, the extremities of the fork arms or branches being provided with depending hooks or stops 12 to engage the outer side of the rake head for assisting in limiting the outer movement of the rake head, and to prevent the rake head from bending or flexing outwardly beyond its normal or active position.

The rake head is spring pressed to normal or active position by means of an arm or strip 13 secured to the forward side or face of the rake head and projecting above the upper edge of the rake head, and slightly beyond the axis of the bolts or pivots 11, a coiled wire retractile spring 14 having one end or extremity engaged with an aperture formed in the upper or free end of the arm 13, and having its other end attached to the shank of the fork, to thereby create a rearward or inward pull upon the arm 13 for influencing the rake head to swing to normal position at right angles to the plane of the fork. The rear or inner end of the spring 14 is attached to the shank of the fork, by means of a strip 15 secured between the portions 4 of the fork shank and having its outer end projecting and formed with a hook 16 for the engagement of the end of the spring 14.

In order to rigidly lock the rake head in active or normal position, a pair of latches 17 have certain ends pivoted upon those flanges of the angle members or pieces 9 which project beyond the lip 8 of the rake head and which have the ears 10, rivets or other securing members 18 being employed for riveting or fulcruming the latches 17 to the members 9, and the free portions of the latches 17 being arranged to swing snugly under the lower edges of the fork arms when the rake head is in normal position, to thereby restrain the inward swinging movement of the rake head, and to hold the rake head in active position. The latches 17 are also preferably provided with shoulders or portions 19 arranged to swing over the upper edges of the fork arms when the rake head is swung against or parallel with the fork, as seen in Fig. 1, to thereby hold the rake head in such position, as when the rake is being carried, or is stored away when not in use.

The present rake is adapted for both garden and lawn uses, or the like. When it is desired to clear the rake teeth from time to time, during the use of the rake, the latches 17 are swung out of engagement with the fork arms, to thereby permit the rake head to be swung inwardly or toward the fork, against the tension of the spring 14. It is to be noted that ordinarily, when the rake is being drawn toward the operator, the spring 14 will be assisted by the action of the teeth upon the soil, in holding the rake head in normal or active position, in order that the rake may be readily manipulated for the usual raking purposes. Now, when it is desired to clear the rake teeth, should they become clogged with trash, the rake handle is given a downward or forward thrust, while the rake head engages the soil, which will cause the rake head to be swung rearwardly or inwardly toward the fork, and to ride forwardly upon the soil with the teeth rearmost, and which will result in the accumulations being engaged by the soil, so as to be ejected or extracted from the rake teeth, to clear the same. As soon as the pressure upon the rake handle is released, and the rake is again lifted to be used for raking, the rake head will be automatically swung to normal position through the influence of the spring 14, as above indicated. It is to be noted that the rearwardly projecting portions of the upper edge of the rake head, which have the ears 10, which are pivoted to the fork arms, enables the rake head to swing downward in such a way, that the teeth may readily ride upon the soil, when the handle is thrust forwardly, and in such a manner, that the teeth may be cleared of any accumulations without liability of the fork arms encountering the soil. It is thus a convenient matter for the operator to clear the rake teeth from time to time, the rake head not being encumbered by any clearing or ejecting mechanism, which would be objectionable for various reasons. When it is not desired to leave the rake head free to swing, as above described, the latches 17 may be swung into engagement under the fork arms for locking the rake head in normal or active position, in which event, the rake may be employed in the manner of an ordinary rake having a rigid rake head.

When the rake is not in use, such as when being carried or stored away, the rake head may be swung parallel with or against the fork, for sake of protection and compact arrangement, and the latches 17 may be swung so as to engage the shoulders 19 thereof over the fork arms, which will retain the rake head in folded position. This is facilitated due to the fact that when the rake head is swung against the fork, the free end of the arm 13 will be swung slightly beyond the plane of the fork, in which the pivots 11 lie, so as to swing the said arm and spring beyond dead center, in order that the spring will have a slight tension, tending to hold the rake head in folded position.

The spring 14 is not only disposed between the arms of the fork, to be protected thereby, but is also so arranged, as not to interfere with the action of the rake head, during the use of the rake in the usual manner, and at the same time, the spring effectively serves its purposes.

From the foregoing, taken in connection with the drawing, the other advantages and capabilities of the present invention will be obvious to those versed in the art, and need not be described at length.

Having thus described the invention, what is claimed as new is:—

1. A hand rake embodying a handle having a fork at one end, a spring held toothed rake head having its upper edge pivoted to the fork arms, means for limiting the forward movement of the rake head, and latches carried by the upper edge portion of the rake head and adapted to swing under the fork arms when the head is in active position to thereby lock the same in such position.

2. A hand rake embodying a handle having a fork at one end, a toothed rake head having upstanding rearwardly offset ears at its upper edge pivoted to the fork arms, whereby the rake head may swing rearwardly to ride upon the soil when the handle is thrust forwardly, the upper edge of the rake head being disposed below the fork and having an upwardly projecting arm, and a returning spring connected to the said arm.

3. A hand rake embodying a handle, a supporting member attached to one end thereof, a spring held toothed rake head having its upper edge pivoted to the supporting member, and a locking device carried by the rake head and adapted to engage the supporting member when the rake head is either in active position, or folded against the supporting member, to thereby lock the rake head in either its active or folded position.

4. A hand rake embodying a handle having a fork at one end, a spring held toothed rake head having its upper edge pivoted to the fork arms, and latches carried by the upper edge portion of the rake head and adapted to swing under the fork arms when the head is in its active position to thereby lock the same in such position, the latches having means engageable over the fork arms when the rake head is swung against the fork.

In testimony that I claim the foregoing as my own, I have hereto affixed my signature in the presence of two witnesses.

EDWIN C. STEELE.

Witnesses:
RALPH W. MCCONNELL,
ALFRED H. MAGUIRE.